United States Patent [19]

Kirk et al.

[11] 4,170,328

[45] Oct. 9, 1979

[54] DESALINATION BY THE INVERSE FUNCTION OF THE KNOWN (SALTING-OUT) EFFECT WITHIN AN IMPROVED CENTRIFUGE

[76] Inventors: Samuel A. Kirk, Box 65, Pringle, S. Dak. 57773; Clair F. Kirk, 856 Pine St., Wheatland, Wyo. 82201

[21] Appl. No.: 874,708

[22] Filed: Feb. 2, 1978

[51] Int. Cl.² .............................................. B04B 1/00
[52] U.S. Cl. ......................................... 233/13; 210/45; 210/48; 210/59; 210/78
[58] Field of Search ................... 210/42 R, 45, 48, 51, 210/59, 60, 61, 65, 70, 78, 201, 216, 360 A; 233/13, 17, 18

[56] References Cited

U.S. PATENT DOCUMENTS

| | | | |
|---|---|---|---|
| 2,549,968 | 4/1951 | Hachmuth | 233/13 |
| 2,904,511 | 9/1959 | Donath | 210/48 |
| 2,963,219 | 12/1960 | Palmqvist | 233/18 |
| 3,309,016 | 3/1967 | O'Brien | 233/18 |
| 3,430,853 | 3/1969 | Kirk et al. | 233/23 R |
| 3,880,347 | 4/1975 | Kirk et al. | 233/32 |
| 3,885,734 | 5/1975 | Lee | 233/13 |

FOREIGN PATENT DOCUMENTS 629457 10/1961 Canada .................................... 233/13

*Primary Examiner*—Robert H. Spitzer
*Assistant Examiner*—Ernest G. Therkorn

[57] ABSTRACT

Hydrogen gas is injected into sea water preceding treatment in an improved pocket type centrifuge. The catalytic effects of hydrogen gas within the confining walls plus hydraulic, inertia, and centrifugal forces acting within the improved pocket type centrifuge give an inverse function of the known salting-out effect in which the hydrogen rejects the salt and floats the fresh-water from the system. The hydrogen gas is separated from the fresh-water by a second improved pocket type centrifuge and recycled for efficiency in the process.

7 Claims, 1 Drawing Figure

DESALINATION BY THE INVERSE FUNCTION OF THE KNOWN (SALTING-OUT) EFFECT WITHIN AN IMPROVED CENTRIFUGE

CROSS-REFERENCE TO RELATED APPLICATIONS

Kirk et al acquired U.S. Pat. No. 3,880,347 known as the Inertia Centrifuge with the accomplished objective of providing a pocket type centrifuge with non-swirl action and thereby converting inertia to a separating force in conjunction with centrifugal force for heavies. Copending Ser. No. 874,709 provides improvements to U.S. Pat. No. 3,880,347. In the present application the term "improved pocket type centrifuge" is used for the mechanical device needed in the process.

BACKGROUND OF THE INVENTION

The efficiency of known processes of desalination is very low. The theoretical energy requirement to convert sea water to fresh water is 2.65 kwh (expressed in electrical energy) per 1000 gallons (4049 liters).

The force required for removal of salts by centrifugal means was given by O'Brien in U.S. Pat. No. 3,309,016. Kirk et al reduced the amount of centrifugal force needed by U.S. Pat. No. 3,430,853 in which swirl was removed from within the high gravity chamber. In Kirk et al U.S. Pat. No. 3,880,347 inertia was added as a separating force. With the present disclosure, hydrogen produces a differential density in the system, adds a force of electrostatic repulsion, and has an effect similar to the common ion effect which aids precipitation from a saturated solution. These improvements increase the efficiency of the centrifugal desalination process.

BRIEF SUMMARY OF THE INVENTION

The improvement in a process of desalination consists of injecting hydrogen gas, for a catalytic effect, into sea water preceding treatment in an improved pocket type centrifuge. The confining centrifuge and the forces within it produce an inverse function of the known "salting-out" effect in which hydrogen molecules attach themselves to fresh-water molecules and produce a partial separation because of differential density with heavier entities of electrostricted water molecules surrounding sodium and chlorine ions. A second partial separation is produced by electrostatic repulsion of protons, within the confined hydrogen molecules, against the positive charged sodium ions, within the electrostricted entities. The two partial separations produce a saturated solution of salt ions, with the formation of salt crystals, aided by a similarity to the common ion effect between the positive charged protons and the positive charged sodium ions. A lights discharge of a mixture of hydrogen, entrained air, and fresh-water is produced and also a heavies discharge of salt slurry. The lights discharge is further treated by a second improved pocket type centrifuge that produces aerated water and hydrogen gas that is recycled for efficiency in the process.

Figure 1:
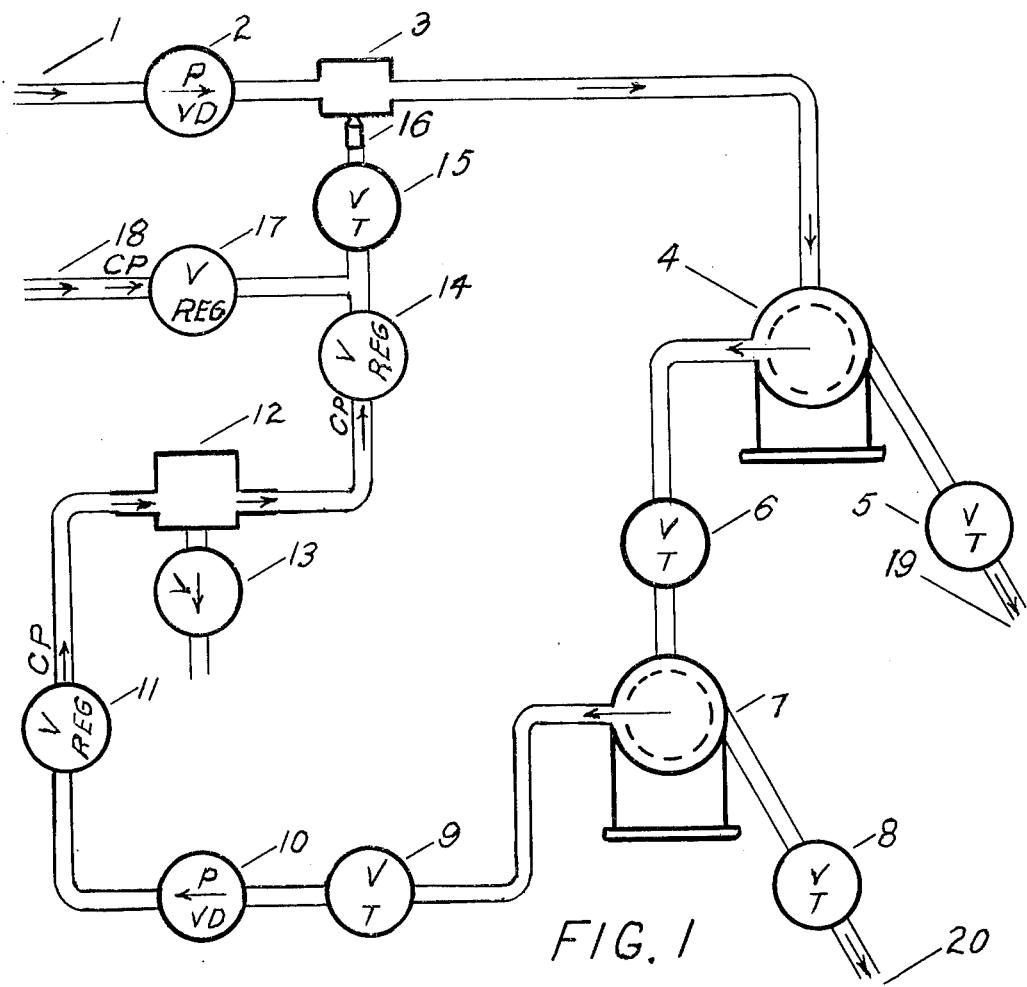
FIG. 1 is a schematic drawing for a small plant. The prescreened sea water flows in at point 1. Point 2 is a pump with variable delivery, while 3 is a mixing chamber for the injection of hydrogen gas, from where the system goes to the improved pocket type centrifuge at 4 with throttle valves 5 and 6 on the exits for regulating purposes. The heavies separation is a salt slurry at point 19. The lights discharge is an air, hydrogen and water mixture that is separated at the improved pocket type centrifuge at 7, with throttle valves 8 and 9 on the exits for regulation with water and air discharged at 20. The hydrogen with traces of water vapor and air goes through a variable delivery pump 10 and through a constant pressure outlet valve at 11 to a gas accumulator at 12 which has a blow-down valve at 13 for removal of air and water that separate out. Valves 14, 15 and 17 control the flow of the hydrogen with 15 as a variable throttle for volume. Point 16 is an injector nozzle for suppling the hydrogen to the injection chamber at 3.

The following definations and explanations with aid in understanding the process.

Common hydrogen consists of molecules, each of which contains two atoms. The hydrogen atom consists of a single proton as the nucleus, plus a single electron. The proton carries a positive charge. The two electrons within the hydrogen molecule are of opposite spin and produce a covalent bond for the molecule although the formal charge of these electrons is zero. The simple molecule of hydrogen develops a force because the electron effects cancel, leaving the electrostatic repulsion by the positive electric charge on the protons. Hydrogen gas is a non-electrolyte.

The "salting-out" effect is a known phenomenon that rejects a non-electrolyte such as hydrogen and carbon dioxide from an aqueous solution when a salt such as sodium chloride is added. This effect is due to the electrostatic repulsion by the positive protons, either as hydronium ions or in hydrogen molecules, in the non-electrolyte against the positive sodium ions. In the present invention the term "electrostatic repulsion" will refer to the recognized fact that when a proton approaches a nucleus, the interaction is an electrostatic repulsion. The positive proton repels the positive sodium ion.

The word catalytic is a chemical term that we are applying to a physical action or to physics. We therefore use the expression "catalytic similarities" as our definition of the word catalytic when we speak of hydrogen catalytic effects in the process. The same is true for the term "common ion effect", when we use the positive charge of each proton in the hydrogen molecule as an equal to the positive charge of each sodium ion. When positive charged protons are present the saturation point of sodium chloride ions is lowered in a solution. We call this a "common ion similarity effect".

In the process, after the sea water enters at point No. 1, the pump at No. 2 is of variable delivery because the flow must be variable for the improved pocket type centrifuge at 4 when the throttle valves at point 5 and 6 are adjusted. This pump also furnishes the hydraulic pressure that is needed to force the heavies from the centrifuge. No. 3 is a mixing chamber where hydrogen gas is injected into the sea water by the nozzle No. 16 with the only requirement being an even distribution of the gas. The pressure at the nozzle must be higher than the hydraulic pressure at the pump No. 2. The improved pocket type centrifuge at No. 4 discharges a salt slurry, through the variable throttle valve at 5, and point 19. The amount of separation by No. 4 is controlled by the throttle valve at 6. The throttle valve at 5 is normally left open except when it is needed to give a time element to the separation at 4. The lights ejection from the centrifuge at 4 containing hydrogen gas, air and water, goes to the second improved pocket type centrifuge at 7 which produces aerated water at point 20. The throttle valves at 8 and 9 are carefully adjusted to give the centrifuge at 7 a time element in the separation that permits the period of treatment at 7 the same time as at centrifuge 4, for a smaller volume of throughput. The hydrogen with traces of water vapor and air goes through a variable delivery pump at 10 and a constant pressure outlet valve at 11 that is set to produce $\pm 1$ kg. per sq. centimeter higher pressure than the hydraulic pressure produced by the pump No. 2. This is to inject the hydrogen as required at the nozzle No. 16. From the valve at 11 the hydrogen gas with traces of water vapor and air go to the accumulator at 12 with a blow-down valve at 13 which is operated manually or is made to operate automatically. Two constant pressure inlet valves, 14 and 17, separate the recycled hydrogen from the supplied or purchased hydrogen from point 18, with the valve at 14 set slightly higher than valve 17 to insure use of the recycled hydrogen when it is available. Valve 15 controls the amount of hydrogen used in the process. However, the amount of hydrogen used must be based on the results obtained because of the variables in the process and the amount is at least that which is soluble in the same volume of fresh water under the same conditions of temperature and pressure.

The system containing sea water is in equilibrium and will change only with conditions that determine the amount of energy, and its form, contained in the system. The temperature is not a limiting factor and the natural temperature of sea water, at the place of operation, is satisfactory.

OBJECTS OF THE INVENTION

The first and over-all object of this invention is the desalination of sea water as represented by the catalytic action of added hydrogen gas, with mechanical separation of the system, aided by an inverse function of the known "salting-out" effect which is produced by the confined forces existing in an improved pocket type centrifuge. The forces within the centrifuge consisting of hydraulic, inertia and centrifugal force, establish conditions that permit the catalytic effects of hydrogen to separate both the water from the salt and the salt from the water. In the known "salting-out" phenomenon the hydrogen just rejected its self.

The second object of this invention and the first catalytic effect of the hydrogen gas within the improved pocket type centrifuge is the creation of a differential density within the solution and a first partial separation. It is known that in sea water the salt ions have become hydrated through interaction of their strong electric fields with the electric dipoles of water molecules that prevent the ions from coming together to form salt molecules, unless the solution is saturated, and by electrostriction there is a shrinkage in the volume of water in the vicinity of the salt ions. The salt ions carry a firmly attached sheath of water molecules held in place by ion-dipole forces and thereby become an entity in the solution. It is also known that the proton in the hydrogen atom has a spin or rotation around an axis similar to the rotation of the earth around the polar axis and has north and south magnetic poles. The two electrons in the hydrogen molecule are of opposite spin and cancel out. Two hydrogen molecules attach themselves to the water molecule because of Van der Waals force, which arises because the water molecule polarizes the hydrogen molecule, and allows the hydrogen to attach the north pole of one proton to one end of the dipole water molecule and the south pole of another proton, in a second hydrogen molecule, to the other end of the said dipole water molecule. This means, in effect, that two hydrogen molecules attach themselves to the water molecule that is free of salt ions and floats the fresh-water away from the said entities containing salt ions. The above explanation shows how a differential density in the system is established and produces a partial separation by concentrating fresh-water from the system.

A third object of this invention and the second catalytic effect of hydrogen is to provide a second partial separation with a concentration of salt ions, by an electrostatic repulsion separation in which, protons within the hydrogen exert a repelling electrostatic force on the said entities of sodium ions held near chlorine ions by electrostriction of water molecules. When the repulsion is from within the solution, centrifugal force gives a positive charged light particle a near equal repulsive force as a positive charged heavy particle. In considering electrostatic repulsion as a point force, there is some chaotic motion within the solution but the sum of the produced motions of salt ions, as entities, is away from the lights end of the pocket were the hydrogen is confined. A second partial separation is thereby produced within the centrifuge.

A fourth object of this invention is the forming of layers of hydrogen gas and fresh-water which develop streamline flow within themselves and this is accomplished by the electrostatic repulsion acting from the confines of the baffle plates provided by the improved pocket type centrifuge. The said baffle plates hold a layer of hydrogen gas that is trapped from the said partial separations. The electrostatic repulsion, by the protons in the hydrogen, repels the sodium ions and produces a layer of water that is free from salt entities. Streamline flow within each layer, which permits the hydrogen gas and fresh-water to flow parallel and directly to the lights outlet, produces a speed up in the separation.

A fifth object of this invention is the production of salt crystals within part of the pocket and it is accomplished by the two previous said partial separations producing a build-up of salt entities in the pocket at the heavies end, with saturation of the solution producing salt crystals, aided by the common ion similarity of positive charged protons within the hydrogen molecules. When positive charged protons are present they have a common ion effect on the positive sodium ions and this increases the formation of salt crystals. The salt crystals are immediately concentrated by centrifugal and inertia forces and are ejected as a slurry from the high gravity chamber of the centrifuge. The slurry must be held to about 1 part salt to 5 parts to prevent clogging of the plumbing at the heavies outlet. This is accomplished by adjusting the throttle valve 6 near the lights outlet.

A sixth object of the invention is the recycling of hydrogen gas, that is recovered by a second improved pocket type centrifuge, separating the lights discharge of the first improved pocket type centrifuge. This separation is on a gas-water mixture in which the gas consists of hydrogen and the entrained air that was in the sea water. Hydrogen gas and air containing water vapor form layers across the baffle plates of the improved pocket type centrifuge with streamline flow in each gas layer and with the airstream continuing on around the outside of the pocket until it combines with the water and is discharged as aerated water. The hydrogen from the lights outlet is recycled for efficiency in the process.

A seventh object of the invention is giving a time element to the separation in the second improved pocket type centrifuge, wherein the two gases are separated at the lights exit by adjusting the variable throttle valves 8 and 9 of FIG. 1. By a fine adjustment of both throttle valves, the through-put of the second centrifuge is matched to the lights output of the first centrifuge, with more time for the separation on a volume basis. Because the pumps at 2 and 10 are of variable delivery, a time element for the separation in either centrifuge at 4 or 7 is variable and a finer or more complete separation is possible, when desired, without changing the speed or the size of the centrifuges.

Brackish water and other saline solutions of some other salts are amenable to the present process.

Technology exists for the construction of large desalination plants with electrolysis for the production of chlorine, hydrogen and sodium hydroxide that are used, with the addition of lime, in a chemical water softening treatment which removes some salts, including those of boron, and with a further treatment by the present invention which gives an economical production of salt and fresh-water. The water, after this treatment, is especially adapted to drip irrigation when chlorinated.

Substances other than common hydrogen, including carbon dioxide, are adaptable to the process when they carry hydronium ions which furnish protons. Hydrochloric acid gas is an example and this also supplies a common ion effect to aid te separation. This invention embodies the use of hydrogen gas because of its safety in handling and its extreme lightness.

The improved pocket type centrifuge is preferred for the mechanical separation in the process, however the invention is not limited to its use. It is obvious that the heavies are removable by a vacuum pump at the outlet instead of hydraulic pressure at the inlet of the improved pocket type centrifuge when the centrifugal force is less than the force developed by the vacuum pump. The centrifuges are arranged in parallel to produce any desired volume of water.

The entire plant must be constructed from materials that resist corrosion from salt and hydrogen. Stainless steel is satisfactory for parts that require strength and plastics are satisfactory for other parts.

It is optional to deaerate the sea water after screening and before entering the plant by separating in the Inertia Centrifuge, U.S. Pat. No. 3,880,347 or the improved pocket type centrifuge, as part of the preparation.

It is also optional to pretreat the sea water chemically for water softening and with the addition of lime for removal of boron salts when and if the boron interfers in any way. Lime in the form of calcium hydroxide Ca(OH)$_2$ precipitates the boron salt (Ca$_2$B$_6$O$_{11}$.5H$_2$0) as insoluble calcium borate.

We claim:

1. A continuous process of desalination of sea water which comprises the use of known centrifugal and inertia force as produced by a pocket type centrifuge to separate lights from heavies and it is known that sea water becomes hydrated and consists of entities of electrostricted water molecules that surround the sodium chloride ions, and there is a known "salting-out" effect, with the said process beginning with prescreened sea water which is treated by mechanical means wherein the improvement consists of, injecting hydrogen gas into sea water and then using the catalytic effects of the hydrogen as well as the three forces within the pockets of a first non-swirl action pocket type centrifuge, that utilizes hydraulic, inertia and centrifugal force for separating fluid mixtures and which produce an inverse function of the said "salting-out" effect within the said centrifuge, wherein hydrogen produces a differential density by attaching hydrogen molecules to fresh-water molecules and floating away from the heavier said entities, which results in a partial separation within the said pockets, with a second partial separation within the same said pockets, in which positive charged protons in the hydrogen reject the salt by electrostatic repulsion of the positive sodium ions held within the said entities, with the electrostatic repulsion acting both within the solution and from the confines of the said first pocket type centrifuge, and in which the sum of the salt entities motions, produced by the said electrostatic repulsion, is away from the lights end of the said pockets, with the said first and the said second partial separations forming a layer of hydrogen trapped between the baffle plates contained in said first pocket type centrifuge, from which, electrostatic repulsion produces a layer of water that is free of salt ions, with streamline flow in each said layer and producing a lights discharge of a mixture of fresh-water, air and hydrogen gas, while the concentration of said entities, containing salt ions from both previous said partial separations, produces a saturated solution of salt ions with the formation of salt crystals, aided by a similarity to the common ion effect of protons, and the said crystals are discharged as heavies in the form of a slurry, with a second improved pocket type centrifuge provided to separate the hydrogen from the said lights discharge of the first said improved pocket type centrifuge and the recovered hydrogen gas is recycled, while the heavies discharge is aerated fresh water, while the said second improved pocket type centrifuge is provided with a heavies exit throttle valve in addition to the lights exit throttle valve and a fine adjustment of both said valves give a time element to the separation that permits the period of treatment in said second centrifuge at the same time as said first centrifuge.

2. The process according to claim 1, wherein the gas-liquid system, of hydrogen and sea water, is subjected to a confined mechanical separation, is aided by a differential density produced by the said hydrogen molecules which attach themselves to fresh-water molecules by Vander Waals force and thereby float the fresh-water molecules away from the electrostricted salt entities.

3. The process according to claim 1, wherein the said second partial separation is aided by electrostatic repulsion within the solution with some chaotic motion but in which the sum of the said electrostatic produced movements of the salt entities is away from the lights outlet, thereby concentrating the said salt entities.

4. The process according to claim 1, wherein the mechanical separation is aided by the formation of a layer of hydrogen gas and a fresh-water layer with streamline flow within each said layer when the hydrogen is trapped within the confines of said baffle plates and from which the said electrostatic repulsion moves the salt entities away from where the hydrogen is confined to form the said layers with streamline flow which speeds up the separation.

5. The process according to claim 1, wherein the saturation point of sodium ions in the solution is lowered and the formation of salt crystals is aided by the presence of protons that carry a positive charge and have a similar effect as a common ion.

6. The process according to claim 1, wherein the first said lights discharge is subjected to separation by a said second improved pocket type centrifuge, which produces a lights discharge of hydrogen gas that is recycled for process efficiency.

7. The process according to claim 1, wherein the said first lights discharge is subjected to a separation by a said second improved pocket type centrifuge, wherein a fine adjustment of both said exit throttle valves gives a time element for the said separation on a volume treated basis.

* * * * *